United States Patent
Lee

(10) Patent No.: US 10,283,009 B2
(45) Date of Patent: May 7, 2019

(54) SPHERE MAGNETIC LEVITATION SYSTEM AND METHOD OF OPERATING SPHERE MAGNETIC LEVITATION SYSTEM

(71) Applicant: KOREA AEROSPACE RESEARCH INSTITUTE, Daejeon (KR)

(72) Inventor: Seon Ho Lee, Daejeon (KR)

(73) Assignee: KOREA AEROSPACE RESEARCH INSTITUTE, Daejeon (KR)

( * ) Notice: Subject to any disclaimer, the term of this patent is extended or adjusted under 35 U.S.C. 154(b) by 413 days.

(21) Appl. No.: 15/305,896

(22) PCT Filed: Aug. 19, 2014

(86) PCT No.: PCT/KR2014/007672
§ 371 (c)(1),
(2) Date: Oct. 21, 2016

(87) PCT Pub. No.: WO2015/174582
PCT Pub. Date: Nov. 19, 2015

(65) Prior Publication Data
US 2017/0046969 A1 Feb. 16, 2017

(30) Foreign Application Priority Data

May 12, 2014 (KR) .................. 10-2014-0056485

(51) Int. Cl.
*B64G 1/28* (2006.01)
*H02K 7/09* (2006.01)
(Continued)

(52) U.S. Cl.
CPC .............. *G09B 9/52* (2013.01); *B64G 1/283* (2013.01); *B64G 7/00* (2013.01); *G01M 99/00* (2013.01); *H02K 7/09* (2013.01); *H02N 15/00* (2013.01)

(58) Field of Classification Search
CPC ...... H02N 15/00; H02K 7/09; F16C 32/0406; F16C 32/0485; F16C 32/0487; F16C 32/0489; B64G 1/283; B64G 1/285
(Continued)

(56) References Cited

U.S. PATENT DOCUMENTS 2,942,479 A * 6/1960 Hollmann .............. G01C 19/38
250/203.1
4,661,737 A * 4/1987 Barri ...................... H02K 17/16
244/166

(Continued)

FOREIGN PATENT DOCUMENTS

JP 07-004972 A 1/1995
JP 4942173 B2 5/2012
(Continued)

*Primary Examiner* — Jeremy A Luks
(74) *Attorney, Agent, or Firm* — Novick, Kim & Lee, PLLC; Jae Youn Kim

(57) ABSTRACT

Provided is a sphere magnetic levitation system having magnetic-aligning devices that magnetically align the position of a sphere levitated by electromagnets according to whether the sphere is levitated, and a method of operating the sphere magnetic levitation system. The sphere magnetic levitation system includes: a sphere; a plurality of electromagnets symmetrically positioned about the sphere and spaced apart from the sphere at equal distances; and a plurality of magnetic-aligning devices provided around the sphere, and coming into contact with the sphere or separated from the sphere by a predetermined distance according to the modes of the system. The system is operated in one mode from among: an idle mode, in which the magnetic-aligning devices are in direct contact with and support the sphere; and an operation mode, in which the magnetic-aligning devices are separated from the sphere and the sphere is levitated and rotated.

9 Claims, 3 Drawing Sheets

(51) Int. Cl.
*H02N 15/00* (2006.01)
*F16C 32/04* (2006.01)
*G09B 9/52* (2006.01)
*G01M 99/00* (2011.01)
*B64G 7/00* (2006.01)

(58) Field of Classification Search
USPC ........................................................ 310/90.5
See application file for complete search history.

(56) References Cited

U.S. PATENT DOCUMENTS

| | | | | |
|---|---|---|---|---|
| 5,319,577 A | * | 6/1994 | Lee | B25J 9/126 700/259 |
| 5,416,392 A | * | 5/1995 | Lee | B25J 9/126 318/568.1 |
| 5,609,230 A | * | 3/1997 | Swinbanks | F16F 15/03 188/267 |
| 6,803,738 B2 | * | 10/2004 | Erten | H02K 41/031 310/103 |
| 7,479,859 B2 | * | 1/2009 | Gerber | H01F 7/0294 204/155 |
| 7,647,176 B2 | * | 1/2010 | Hayek | G01C 19/24 701/500 |
| 7,762,133 B2 | * | 7/2010 | Chappell | G01C 19/20 73/178 R |
| 9,475,592 B2 | * | 10/2016 | Stagmer | B64G 1/28 |
| 2008/0073989 A1 | * | 3/2008 | Bandera | H02K 7/14 310/80 |
| 2012/0133234 A1 | * | 5/2012 | Da Costa Balas Ferreira | H02K 7/1853 310/179 |
| 2015/0166200 A1 | * | 6/2015 | Kim | B64G 1/24 310/90 |
| 2017/0126087 A1 | * | 5/2017 | Soderberg | H02K 21/042 |
| 2018/0170581 A1 | * | 6/2018 | Zhang | B64G 1/24 |

FOREIGN PATENT DOCUMENTS

| | | | |
|---|---|---|---|
| KR | 10-2014-0014634 A | 2/2014 | |
| KR | 10-1357599 B1 | 2/2014 | |
| KR | 10-1372807 B1 | 3/2014 | |
| WO | WO-2010117819 A1 * | 10/2010 | ............ B64G 1/283 |

\* cited by examiner

SPHERE MAGNETIC LEVITATION SYSTEM AND METHOD OF OPERATING SPHERE MAGNETIC LEVITATION SYSTEM

TECHNICAL FIELD

The present invention generally relates generally to a magnetic levitation system. More particularly, the present invention relates to a sphere magnetic levitation system capable of automatically aligning a sphere regardless of a mode by providing magnetic-aligning devices on the periphery of the sphere, and a method of operating the sphere magnetic levitation system.

BACKGROUND ART

In general, a spacecraft, such as an artificial satellite that obtains information while orbiting around the earth, is provided with an attitude control system for controlling an attitude thereof along a track. The attitude control system is configured such that a driving force generated by a reaction wheel or a thruster is exerted on the spacecraft in a desirable direction as needed, and thereby the attitude of the spacecraft is controlled. To accurately and precisely control the attitude of the spacecraft, the driving force should be respectively applied in axial directions of three axes that are perpendicular to each other, such as the x-axis, y-axis and z-axis.

Recently, a spacecraft attitude control system using a sphere, in which the attitude of the spacecraft is controlled by using a single actuator, has been actively researched, wherein a plurality of electromagnets is provided and spaced apart from each other at 90 degrees on the periphery of a sphere that is disposed in the center of the three axes, and a current is periodically applied to the electromagnets such that a rotating magnetic field is generated on the periphery of the sphere, and thereby the driving force is simultaneously exerted on the three axes by Lorentz force exerted on the sphere.

When the spacecraft attitude control system using the sphere is used to control the attitude of the spacecraft, a computer simulation is performed in advance in order to test reliability and control performance of the spacecraft attitude control system. To perform a simulation, another electromagnet is disposed at an upper portion of the attitude control system, and the sphere is levitated by a magnetic field generated by the electromagnet without falling off by the gravity, thereby staying at a predetermined position, which is disclosed in Korean Patent Application publication No. 10-2014-0014634 as "Sphere magnetic levitation system".

FIG. 1 shows a conventional sphere magnetic levitation system 100.

Referring to FIG. 1, the conventional sphere magnetic levitation system 100 is capable of rotating a sphere 10 in a predetermined direction in a state where the sphere 10 is levitated by using electromagnetic force generated from a plurality of electromagnets 20 disposed on the periphery of the sphere 10. The sphere magnetic levitation system 100 shown in FIG. 1 is configured such that the sphere 10 is levitated by the electromagnetic force, and then rotates without mechanical contact with surrounding components, whereby it is possible to generate high-speed torque with low power consumption.

However, the conventional sphere magnetic levitation system (100) shown in FIG. 1 is problematic for the following reasons.

When the sphere 10 is not levitated by the electromagnets 20, the sphere 10 is not suspended, so when moving the system 100 or changing the direction thereof, the sphere 10 and the electromagnets 20 may be damaged by an impact against the surrounding components caused by vibrations.

When the sphere 10 is levitated by the electromagnets 20, that is, when the sphere 10 rotates at a high speed, an impact between the sphere 10 and the surrounding components may occur by losing the levitation force, causing damage to the entire system 100 when the entire system 100 is out of order or power is cut off due to unforeseen reasons.

To solve the problem described above, a method that mechanically holds the sphere 10 by using a support frame and a ball bearing may be devised. However, in this case, a mechanical friction force may occur because of no magnetic levitation effect, whereby the sphere may not rotate at a high speed, and power consumption may be increased.

DISCLOSURE

Technical Problem

Accordingly, the present invention has been made keeping in mind the above problems occurring in the related art, and the present invention is intended to propose a sphere magnetic levitation system having magnetic-aligning devices that magnetically align the position of a sphere levitated by electromagnets according to whether the sphere is levitated by being provided on the periphery of the sphere.

The present invention is further intended to propose a method of operating the sphere magnetic levitation system.

Technical Solution

In order to achieve the above object, according to one aspect of the present invention, there is provided a sphere magnetic levitation system, including: a sphere; a plurality of electromagnets symmetrically disposed about the sphere and spaced apart from the sphere at equal distances; and a plurality of magnetic-aligning devices provided on a periphery of the sphere, and coming into contact with or being separated from the sphere at a predetermined distance in response to modes of the sphere magnetic levitation system.

In order to achieve the above object, according to another aspect of the present invention, there is provided a method of operating a sphere magnetic levitation system according to the present invention, wherein the sphere magnetic levitation system is operated in one mode between an idle mode and an operation mode, the idle mode for supporting the sphere in a state where the magnetic-aligning devices come into direct contact with the sphere; and the operation mode for rotating the sphere by levitating the sphere in a state where the magnetic-aligning devices are separated from the sphere.

Advantageous Effects

According to the present invention having the above-described characteristics, a sphere magnetic levitation system and a method of operating the same are advantageous in that the sphere may not be damaged by friction with other components constituting the sphere magnetic levitation system both in an operation mode where the sphere is levitated and rotates and in an idle mode where the sphere is neither levitated nor rotates, and when the sphere magnetic levitation system is out of order, such as when power is not provided, it is possible to prevent damage to the sphere by activating the idle mode.

BEST MODE

Figure 1:
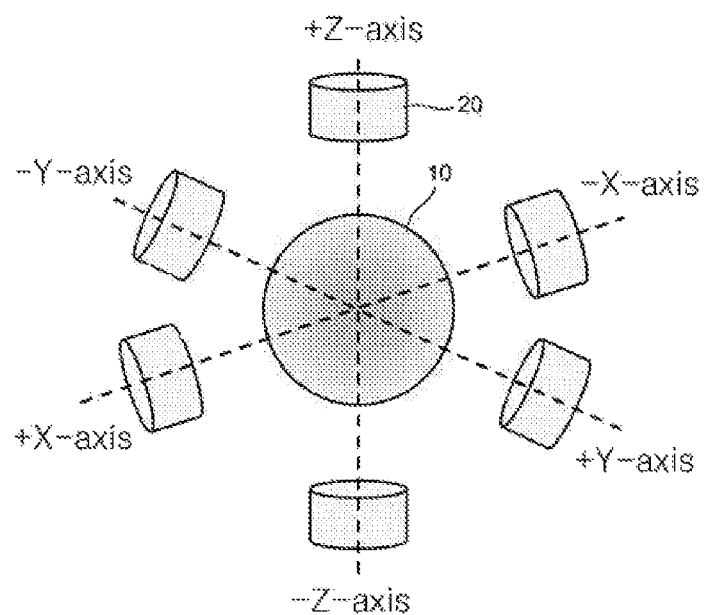
FIG. 1 is a view showing a conventional sphere magnetic levitation system 100.

The invention disclosed herein will be understood better with reference to the accompanying drawings.

Reference will now be made in greater detail to an exemplary embodiment of the present invention, an example of which is illustrated in the accompanying drawings. Wherever possible, the same reference numerals will be used throughout the drawings and the description to refer to the same or like parts.

Figure 2:
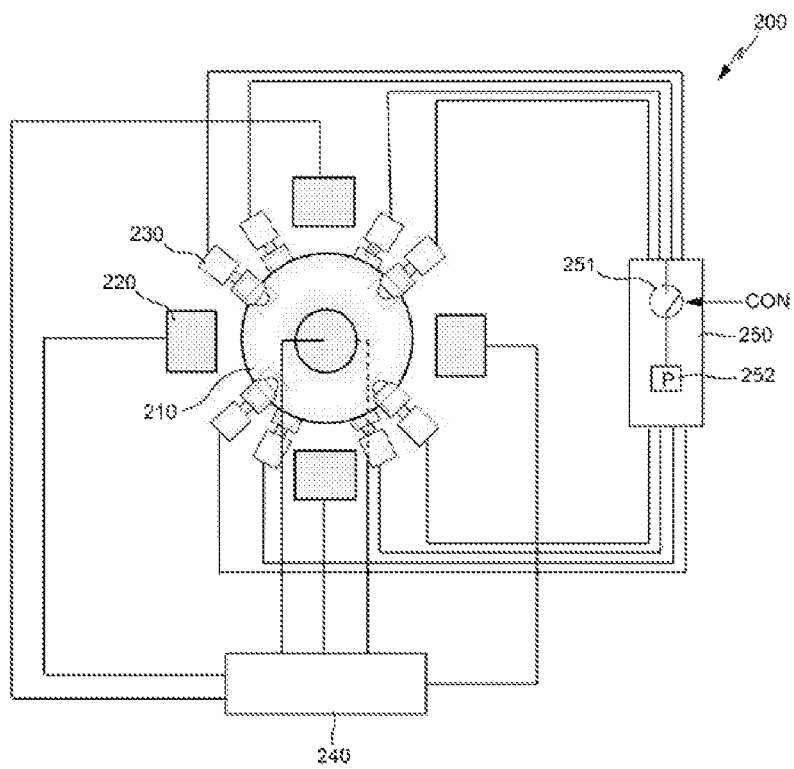
FIG. 2 is a view showing a sphere magnetic levitation system 200 according to the present invention.

FIG. 2 is a view showing a sphere magnetic levitation system 200 according to the present invention.

Figure 3:
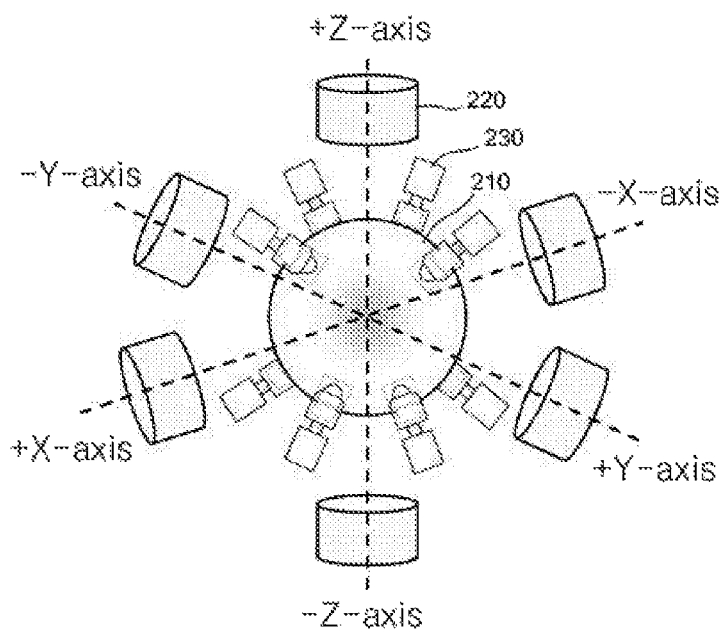
FIG. 3 is a partial perspective view showing the sphere magnetic levitation system of FIG. 2.

FIG. 3 is a partial perspective view showing the sphere magnetic levitation system of FIG. 2.

Referring to FIGS. 2 and 3, the sphere magnetic levitation system 200 according to the present invention includes: a sphere 210, electromagnets 220, magnetic-aligning devices 230, an electromagnet control unit 240, and a solenoid valve control unit 250.

The sphere 210 is made of a material allowing the sphere to be levitated by a magnetic field generated by six electromagnets 220.

Two of the six electromagnets 220 are disposed respectively in three axes, namely x-axis, y-axis, and z-axis, that are perpendicular to each other based on the center of the sphere 210, and it is preferred that the electromagnets are disposed apart from the center of the sphere at equal distances in the positive (+) direction and in the negative (−) direction. For conciseness of description, six electromagnets are provided according to an embodiment of the present invention, but not limited thereto. Twelve electromagnets are provided in Korean Patent No. 10-1357599. Further, according to the embodiment of the present invention, the electromagnets are provided based on the three axes, but it is possible that a plurality of electromagnets are symmetrically disposed about the sphere 210 and spaced apart from the sphere 210 at equal distances.

A plurality of magnetic-aligning devices 230 is provided on a periphery of the sphere 210, and comes into contact with or is separated from the sphere 210 at a predetermined distance in response to modes of the sphere magnetic levitation system 200. Herein, the modes of the sphere magnetic levitation system 200 include: an idle mode for allowing the sphere neither to be levitated nor to rotate; and an operation mode for allowing the sphere to be levitated and rotate when the sphere magnetic levitation system 200 is operated.

The sphere magnetic levitation system 200 according to the present invention supports the sphere 210 in a state where the magnetic-aligning devices 230 come into direct contact with the sphere 210 in the idle mode. Accordingly, thanks to the bearing power, when moving the entire system 100 or changing the direction thereof, the sphere 10 and the electromagnets 20 may not be damaged by vibrations. In the operation mode, the sphere 210 is levitated by the magnetic field generated by the electromagnets 220, and the magnetic-aligning devices 230 are separated from the sphere 210 at a predetermined distance, so a mechanical friction force between the sphere 210 and the magnetic-aligning devices 230 is prevented, and thereby levitation and rotation of the sphere 210 are facilitated.

As described above, the sphere magnetic levitation system 200 according to the present invention limits the movement of the sphere 210 by coming into contact with the sphere 210 in the idle mode, and levitates the sphere 210 in the operation mode, and thereby the sphere 210 is prevented from being damaged by the friction with surrounding components both in the idle mode and in the operation mode. The sphere magnetic levitation system 200 according to the present invention is operated in the idle mode, which will be described hereinafter, when the system is out of order, such as when power is not provided, so damage to the sphere 210 is prevented, which is not prevented in the conventional system.

Reference will be made to a state of the magnetic-aligning devices 230 in the idle mode and in the operation mode, hereinafter.

The electromagnet control unit 240 serves to control movements of the six electromagnets 220, wherein the electromagnet control unit allows the electromagnets 220 to generate a magnetic field having a predetermined size by supplying power to the electromagnets 220. The solenoid valve control unit 250 outputs the solenoid control signal (CON) and supplies power to the solenoid valve 230.

Referring to FIG. 2, the solenoid valve control unit 250 includes: a controller (not shown) activating the solenoid control signal (CON); a solenoid valve power supply 252 supplying power to the solenoid valve 230; and a solenoid valve control switch 251 switching on/off the solenoid valve power supply 252 and the electromagnetic coil of the solenoid valve 230 in response to the solenoid control signal (CON). Hereinafter, reference will be made to the electromagnetic coil constituting the solenoid valve 230, hereinafter.

Though not shown in detail in FIG. 3, it is preferred that the electromagnet control unit 240 and the solenoid valve control unit 250 are powered by the power supplied from a common power supply (not shown). In this case, when external power, namely the power supplied from the common power supply, is cut, the system 200 under the operation mode is quickly operated in the idle mode, and thereby damage to the entire system 200 is prevented.

Figure 4:
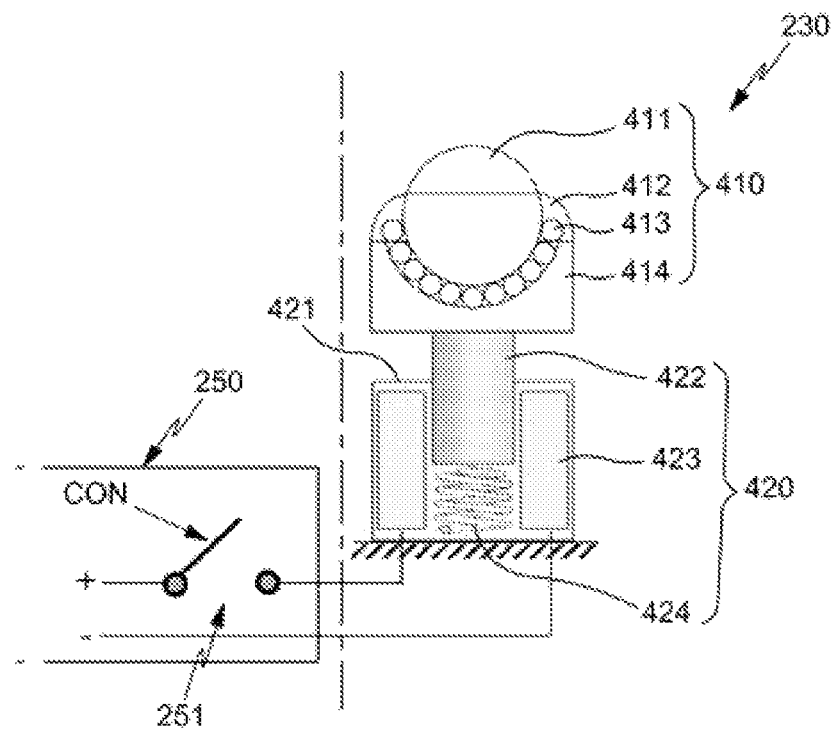
FIG. 4 is a detail view showing magnetic-aligning devices.

FIG. 4 is a detail view showing the magnetic-aligning devices.

Referring to FIG. 4, the magnetic-aligning devices 230 each include: a ball transfer 410; and a solenoid valve 420.

The ball transfer 410 includes: a ball cup 414; a plurality of support balls 413 seated on a hemispherical surface formed inside the ball cup 414; the main ball 411 provided on top of the plurality of support balls 412; and a cover 412 covering all of the plurality of support balls 413 and a portion of the main ball 411 from a side surface of the ball cup 414.

The solenoid valve 420 includes: a body 421; a spring 424 provided at a lower center of the body 421; a plunger 422 with a first end thereof being disposed at an upper portion of the spring 424 and a second end thereof being connected to a lower portion of the ball cup 414; and an electromagnetic coil 423 surrounding the spring 424 and provided at a side surface of the body 421.

The term "plunger" collectively refers to a machine part, similar to a piston that moves reciprocatingly in order to compress or discharge a fluid. In the present invention, the term "plunger 422" is used to refer to an element that is disposed at the upper portion of the spring 424, in consideration of the reciprocating motion of the element.

Reference will be made in detail to an operation of the magnetic-aligning devices 230, hereinbelow.

Figure 5:
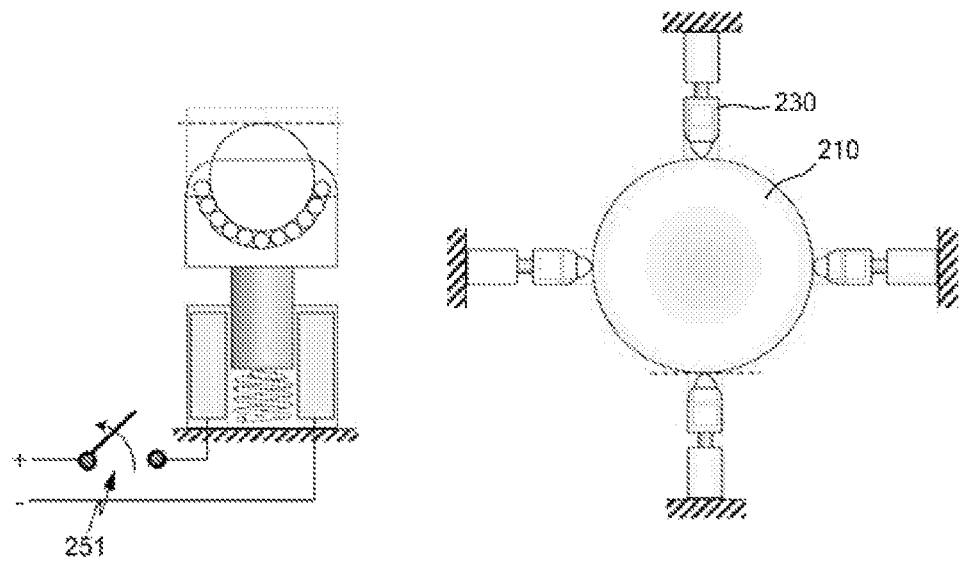
FIG. 5 shows an operational state in the idle mode.

FIG. 5 shows an operational state in the idle mode.

The left view of FIG. 5 shows a state of the magnetic-aligning devices 230, and the right view of FIG. 5 shows a location relation between the plurality of magnetic-aligning devices 230 and the sphere 210.

Referring to FIG. 5, in the idle mode, the solenoid valve control switch 251 is turned off, and the electromagnetic coil is not supplied with power from the solenoid valve power supply 252, so the electromagnetic coil 423 cannot generate the magnetic field. Accordingly, the plunger 422 pushes up the ball cup 414 by the power of the spring 424. Thereby, the main ball 411 provided at an upper portion of the ball cup 414 comes into direct contact with the sphere 210, and physically supports the sphere 210.

Figure 6:
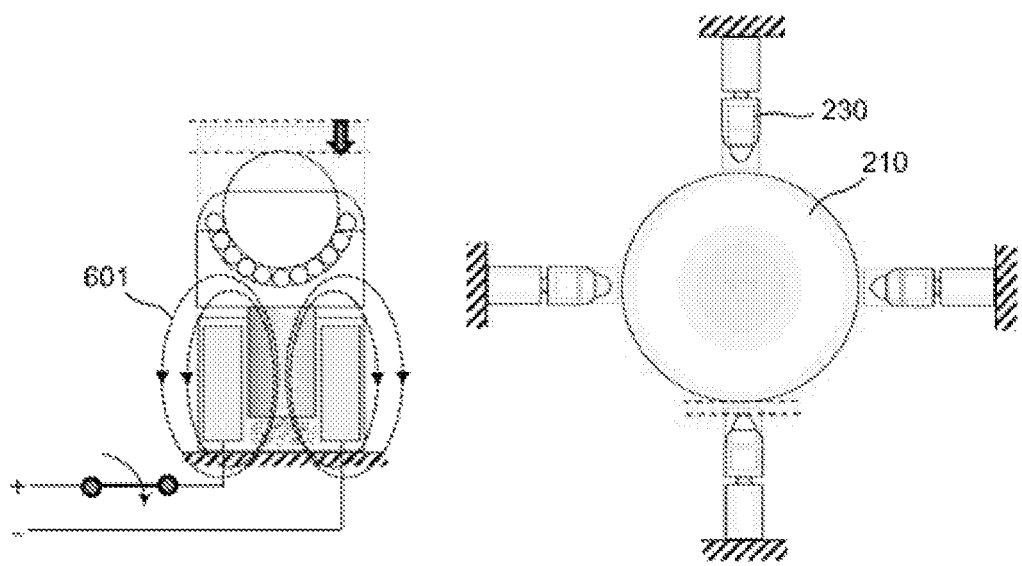
FIG. 6 shows an operational state in the operation mode.

FIG. 6 shows an operational state in the operation mode.

The left view of FIG. 6 shows a state of the magnetic-aligning devices 230, and the right view of FIG. 6 shows a location relation between the plurality of magnetic-aligning devices 230 and the sphere 210.

Referring to FIG. 6, in the operation mode, the solenoid valve control switch 251 is turned on, and the electromagnetic coil is supplied with power from the solenoid valve power supply 252, so the electromagnetic coil 423 generates a magnetic field 601 having a predetermined size according to the supplied power. When a direction of the magnetic field 501 is set to a direction compressing the spring 424, the spring 424 is compressed, and accordingly the plunger 422 pulls down the ball cup 414. Thus, the main ball 411 provided at the upper portion of the ball cup 414 is separated from the sphere 210.

The dotted lines shown in the left views of FIGS. 5 and 6 refer to contact surfaces with the sphere 210, wherein in the idle mode shown in FIG. 5, the main ball 411 comes into contact with the sphere 210, and on the contrary, in the operation mode shown in FIG. 6, the main ball 411 is separated from the sphere 210 by a distance of arrow.

As described above, the sphere magnetic levitation system 200 according to the present invention is capable of preventing critical damage to the entire system 200 even when power is cut off while the sphere 210 is being levitated and rotates in the operation mode.

In the sphere magnetic levitation system 200 according to the present invention, the electromagnet control unit 240 and the solenoid valve control unit 250 may use common power, and power-off means that power is not supplied to either the electromagnet control unit 240 or the solenoid valve control unit 250. In this case, power is not supplied to the electromagnets 220, and the magnetic field generated by the electromagnets 220 is eliminated, and accordingly the levitated sphere 210 goes back to an original position thereof. Here, in the solenoid valve control unit 250, power is not supplied to the solenoid valve 420, and the magnetic field 501 generated by the electromagnetic coil 423 is eliminated. Accordingly, the plunger 422 pushes up the ball cup 414 again by the restoring force of the spring 424. In the case of power-off, as in the above described method, the main ball 411 provided at the upper portion of the ball cup 414 comes into direct contact with the sphere 210, physically supporting the sphere 210, and thereby the entire system 200 is not affected.

As shown in FIGS. 4 to 6, the embodiment of the present invention supposes that when power is not supplied to the electromagnetic coil 423, the spring is released, and on the contrary, when power is supplied to the electromagnetic coil, the spring is compressed; however, the reverse is possible in other embodiments.

In the above description, the sphere magnetic levitation system according to the present invention is used as an attitude control actuator for a satellite. However, the sphere magnetic levitation system can be used as a three-dimensional centrifuge if using a function of generating momentum and torque. Further, the sphere magnetic levitation system can be applied to an actuator for changing a direction and stabilizing attitude of a moving object, such as a satellite, a ship, an aircraft, a motor vehicle, a submarine, and the like.

Although a preferred embodiment of the present invention has been described for illustrative purposes, those skilled in the art will appreciate that various modifications, additions and substitutions are possible, without departing from the scope and spirit of the invention as disclosed in the accompanying claims.

DESCRIPTION OF REFERENCE CHARACTERS OF IMPORTANT PARTS 10, 210: sphere
20,220: electromagnets
230: magnetic-aligning devices
240: electromagnet control unit
250: solenoid valve control unit

The invention claimed is:
1. A sphere magnetic levitation system, comprising:
   a sphere;
   a plurality of electromagnets symmetrically disposed about the sphere and spaced apart from the sphere at equal distances; and
   a plurality of magnetic-aligning devices provided on a periphery of the sphere, and coming into contact with or separated from the sphere at a predetermined distance in response to modes of the sphere magnetic levitation system.
2. The sphere magnetic levitation system of claim 1, wherein the magnetic-aligning devices each include:
   a ball transfer having a main ball coming into direct contact with the sphere; and
   a solenoid valve moving the ball transfer close to or away from the sphere in response to a solenoid control signal.
3. The sphere magnetic levitation system of claim 2, further comprising:
   an electromagnet controller controlling movements of the plurality of electromagnets; and
   a solenoid valve controller outputting the solenoid control signal and supplying power to the solenoid valve.
4. The sphere magnetic levitation system of claim 3, wherein the ball transfer includes:
   a ball cup;
   a plurality of support balls seated on a hemispherical surface formed inside the ball cup;
   a main ball provided on top of the plurality of support balls; and a cover covering the plurality of support balls and a portion of the main ball from a side surface of the ball cup.

5. The sphere magnetic levitation system of claim 4, wherein the solenoid valve includes:
- a body;
- a spring provided at a lower center of the body;
- a plunger with a first end thereof being disposed at an upper portion of the spring and a second end thereof being connected to a lower portion of the ball cup; and
- an electromagnetic coil surrounding the spring and provided at a side surface of the body.

6. The sphere magnetic levitation system of claim 5, wherein the solenoid valve controller includes:
- a controller activating the solenoid control signal;
- a solenoid valve power supply supplying power to the solenoid valve; and
- a solenoid valve control switch switching on/off the solenoid valve power supply and the electromagnetic coil of the solenoid valve in response to the solenoid control signal.

7. The sphere magnetic levitation system of claim 6, wherein
the electromagnet controller and the solenoid valve controller are supplied with power from a common power supply.

8. A method of operating the sphere magnetic levitation system of claim 7, the method comprising:
- an idle mode for supporting the sphere in a state where the magnetic-aligning devices come into direct contact with the sphere; and
- an operation mode for rotating the sphere by levitating the sphere in a state where the magnetic-aligning devices are separated from the sphere.

9. The method of claim 8, wherein
the idle mode is realized by turning off the solenoid valve control switch switching on/off the solenoid valve power supply and the electromagnetic coil of the solenoid valve, or realized by cutting common power supplied to both the electromagnet controller and the solenoid valve controller.

* * * * *